United States Patent [19]

Kawamura

[11] Patent Number: 5,030,185

[45] Date of Patent: Jul. 9, 1991

[54] LIMITED SLIP DIFFERENTIAL

[76] Inventor: Osamu Kawamura, Matsudo, Japan

[21] Appl. No.: 486,152

[22] Filed: Feb. 28, 1990

Related U.S. Application Data

[62] Division of Ser. No. 191,554, May 9, 1988.

[30] Foreign Application Priority Data

May 8, 1987 [JP] Japan .................................. 62-110659

[51] Int. Cl.[5] ............................................. F16H 1/38
[52] U.S. Cl. ..................................... 475/227; 475/248
[58] Field of Search ................ 475/226, 227, 248, 252

[56] References Cited

U.S. PATENT DOCUMENTS

| | | | |
|---|---|---|---|
| 2,484,273 | 10/1949 | Desmoulins | 475/252 X |
| 2,666,343 | 1/1954 | Casa-Massa | 74/715 |
| 2,737,829 | 3/1956 | Wilson | 425/248 X |
| 3,528,323 | 9/1970 | Kamlukin | 74/714 |
| 3,605,522 | 9/1971 | Grosseau | 475/248 X |
| 4,245,524 | 1/1981 | Dammon | 74/714 X |
| 4,535,651 | 8/1985 | Chambers | 74/714 X |
| 4,677,875 | 7/1987 | Batchelor | 475/252 X |
| 4,721,010 | 1/1988 | Sheldon et al. | 74/665 X |
| 4,732,053 | 3/1988 | Gleasman et al. | 74/710 X |
| 4,751,853 | 6/1988 | Dissett | 74/715 |
| 4,791,832 | 12/1988 | McCaw | 74/710 X |

*Primary Examiner*—Dwight Diehl
*Attorney, Agent, or Firm*—McGlew & Tuttle

[57] ABSTRACT

A limited slip differential that uses worms and worm wheels, wherein two or more groups of worm wheels are rotated on a planetary carrier without using a spur gear which has heretofore been employed to mesh the worms with each other. An even-numbered of worm wheels are provided, and pinions are respectively connected to the worm wheels in such a manner that the pinions are alternately disposed at either one or the other of the axial ends of each of the worm wheels. The arrangement provides that the worm wheels are alternately in engagement with a pair of internal gears coupled to respective differential rotary shafts through the pinions.

5 Claims, 8 Drawing Sheets

LIMITED SLIP DIFFERENTIAL

This is a divisional application of application Ser. No. 191,554 filed May 9, 1988 now abandoned.

BACKGROUND OF THE INVENTION

This invention relates to a limited slip differential and more particularly to a limited slip differential, suibable for use in passenger cars. It has heretofore been customary for a long period of time that the so-called selective system is mainly used in four-wheel passenger cars wherein the driver operates by means of a switch a rigid four wheel drive for direct connection between the front and rear wheel shafts and (4 WD) two wheel drive (2 WD) for driving only one of the wheel shafts by releasing the aforesaid connection. However, along with the fact that the merit of four-wheel drive vehicle for use on the usual road has been recognized as important, the drawbacks of the selective system have also become recognizable. Such drawbacks are concerned with the problem of tight-turn braking. Namely at the time of turning the car, the front wheels and rear wheels depicts circle of different radii, thus causing different distances of their movements so that the difference in rotation of the wheels cannot be avoided. In order to avoid such inconvenience, it becomes necessary to incorporate differential gears between the front and rear wheel shafts. In this way, shifting operation of 2 WD and 4 WD may be dispensed with. However, in the case of differential gears consisting of usual bevel gears or planetary gears, the structure concerned is such as to delay the rotation of the resistance-loaded shaft so that when counter force on one-side output shaft becomes less, the shaft will rotate idly until relative driving force is lost. Therefore, in order to prevent the aforesaid condition assuredly in the case of the center-differential 4 WD, such a mechanism becomes necessary as a differential lock or limited slip system. Yet, the center-differential 4 WD becomes complicated in construction and moreover, there occurs the drawbacks of a braking phenomenon at the time of locking.

The Torsen differential system is one of the means which are considered to be capable of solving the above-described problems. The Torsen differential system is one type of differential that employs a worm gear. In the Torsen differential system, a worm is meshed with a worm wheel which has a relatively large diameter and which rotates in a direction perpendicular to the direction of rotation of the worm to limit the differential motion in accordance with the running condition of the vehicle by making good use of the irreversibility of the worm that, when the worm is rotated, the worm wheel is rotated smoothly, whereas, when the worm wheel is activated to rotate so as to turn the worm, the worm wheel can hardly rotate. The structure and operation of the Torsen differential system will be briefly described below. Worm wheels are rigidly secured to two outputs shafts, respectively, and worms are meshed with the respective worm wheels, the worms being meshed with each other through a spur gear. Driving power is applied to the pair of worms. When the speeds of rotation of the two output shafts are equal to each other, the worms do not rotate but force the worm wheels to rotate shafts in opposite directions with substantially the same level of rotational force, but when the vehicle turns a corner at low speed, the worms rotate so as to allow the output shafts to rotate differentially. However, when large reacton force acts on only one output shaft, that is, the corresponding worm wheel alone, the irreversibility of the worm gear functions to suppress generation of a large rotational speed difference between the two output shafts. The degree of differential motion is adjusted in accordance with the relationship between the level of driving power applied to the worms, the level of the reaction force acting on the output shaft and the level of the force from the worm wheels at which the worms are rotated.

The Torsen differential performs an effective limitation on differential motion with the above-described structure. It suffers, however, from the disadvantages that the overall size of the apparatus is unfavourably large and this unavoidably increases the weight and production cost of the differential system.

OBJECTS OF THE INVENTION

It is a primary object of the present invention to provide a limited slip differential which has a simplified structure and yet performs an accurate operation.

It is another object of the present invention to provide a limited slip differential that uses worms and worm wheels, wherein two or more groups of worms are rotated on a planetary carrier without using a spur gear, thereby reducing the overall size and weight of the apparatus by a large margin.

SUMMARY OF THE INVENTION

To these ends, the present invention provides a limited slip differential comprising: a planetary carrier; four or more even-numbered worms radially disposed on the planetary carrier; a number of worm wheels which is the same as the number of worms, the worm wheels being alternately in mesh with the worms, the worm wheels being disposed on the planetary carrier such that the respective axes of the worm wheels extend parallel with the axis of the planetary carrier; pinions connected directly to the worm wheels, respectively, the pinions being alternately disposed at either the left- or right-hand end of each of the worm wheels (on a first side of the worm wheels and on a second side of th worm wheels); and a pair of left and right internal gears respectively coupled to a pair of left and right rotary shafts which rotate differentially, the internal gears being in mesh with the two, i.e., the left- and right-hand, groups of pinions, respectively.

In the above-described arrangement, driving power is transmitted through a propeller shaft, a pinion and a speed reducing wheel so as to activate the worm wheels on the planetary carrier to rotate together in one unit. When there is a rotational speed difference between the left and right axles of the vehicle which are rotated through the left and right internal gears, respectively, the two axles are allowed to rotate differentially through the worm wheels and the worms. However, when there is a relatively large rotational speed difference between the left and right axles, the differential rotation of the axles is limited by the irreversible function of the worms.

The above-described limited slip differential may be applied to a center differential. More specifically, according to another aspect of the present invention, there is provided a limited slip differential comprising: a planetary carrier of a double differential which enables differential rotation between a left-front axle and a right-rear axle and also between a right-front axle and a left-rear axle; four or more even-numbered worms radially disposed on the planetary carrier; a number of worm wheels which is the same as the number of worms, the worm wheels being alternately in mesh with the worms, the worm wheels being disposed on the planetary carrier such that the respective axes of the worm wheels extend parallel with the axis of the planetary carrier; pinions connected directly to the worm wheels, respectively, the pinions being alternately disposed at either the left- or right-hand end of each of the worm wheels (on a first side of the worm wheels and on a second side of the worm wheels); and a pair of left and right internal gears respectively coupled to a pair of left and right rotary shafts which rotate differentially and a pair of front and rear internal gears respectively coupled to a pair of front and rear rotary shafts which rotate differentially, these four internal gears being in mesh with the corresponding pinions, respectively.

By virtue of this arrangement, the differential motion is first limited in the center differential by the function of the limited slip differential according to the present invention and then further limited in the limited slip differentials of the present invention which are provided for the front and rear axels, so that it is possible to obtain a differential rotation which is comformable with any road running condition.

According to still another aspect of the present invention, there is provided a limited slip differential comprising: a planetary carrier; four or more even-numbered worms radially disposed on the planetary carrier; a number of worm wheels which is the same as the number of worms, the worm wheels being alternately in mesh with the worms, the worm wheels being disposed on the planetary carrier such that the respective axes of the worm wheels extend parallel with the axis of the planetary carrier; pinions connected directly to the worm wheels, respectively, the pinions being alternately disposed at either the left- or right-hand end pf each of the worm wheels (on a first side of the worm wheels and on a second side of the worm wheels); an internal gear coupled to an input shaft, the internal gear being in mesh with either one or the other of the two, i.e., the left- and right-hand, groups of pinions; and a sun gear interlocked with a front axle, the sun gear being meshed with at its outer periphery with the remaining group of pinions which rotate on a center planetary carrier directly connected to an inner shaft interlocked with a rear differential.

By virtue of the above-described arrangement, it is possible to distribute relatively large torque to a planetary carrier shaft which is interlocked with the rear axle.

As described above, it is possible according to the present invention to reduce considerably the overall size and weight of a limited slip differential that employs worm wheels as compared with the conventional Torsen differential and also possible to lower the production cost by a large margin.

BRIEF DESCRIPTION OF DRAWINGS

The above and other objects, features and advantages of the present invention will become clear from the following description of the preferred embodiments thereof taken in conjunction with the accompanying drawings, in which.

DETAILED DESCRIPTION OF THE INVENTION

Figure 1:
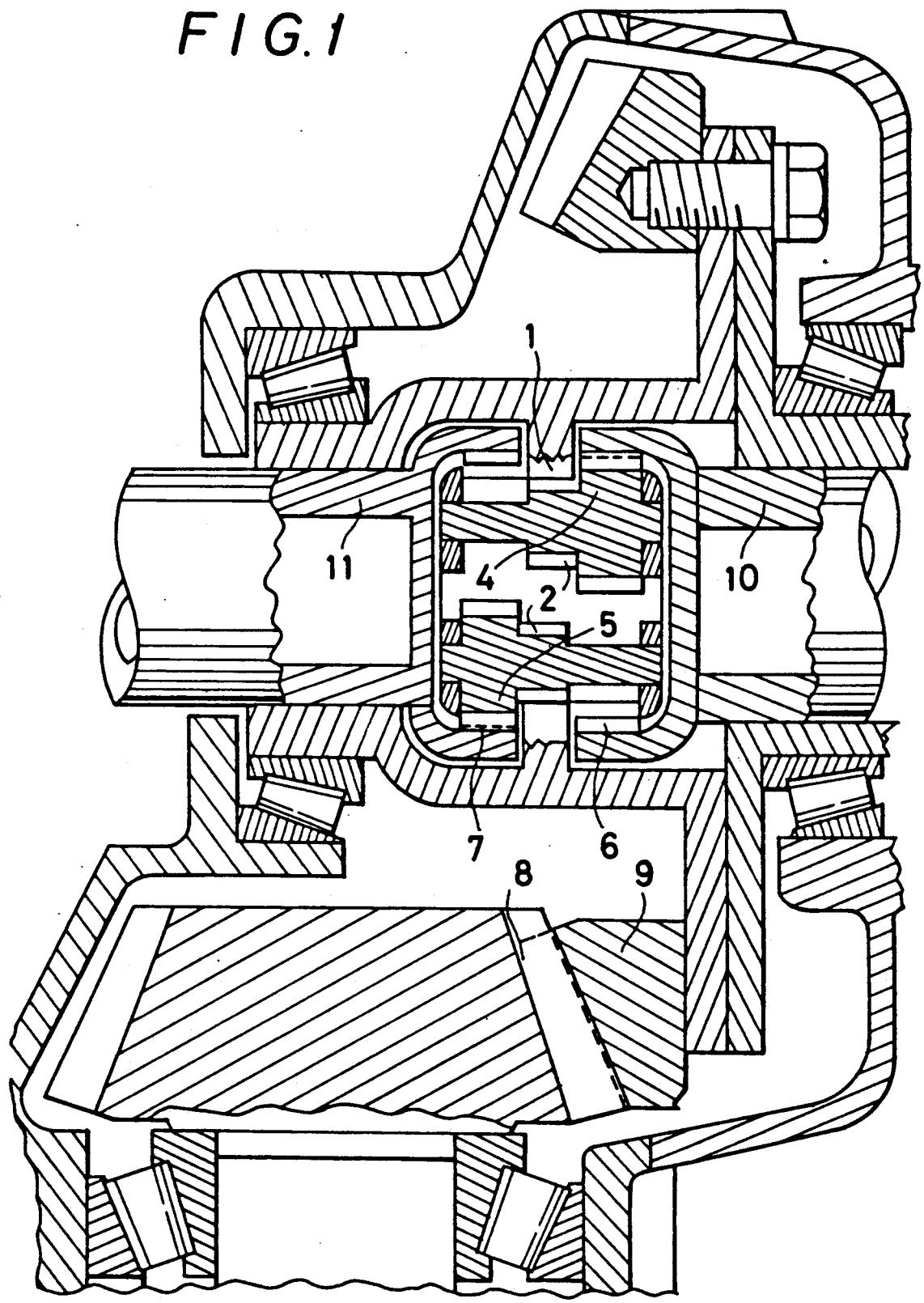
FIG. 1 is a horizontal sectional view showing the structure of one embodiment of the limited slip differential according to the present invention in which the present invention is applied to a four-wheel drive car.
Figure 2:
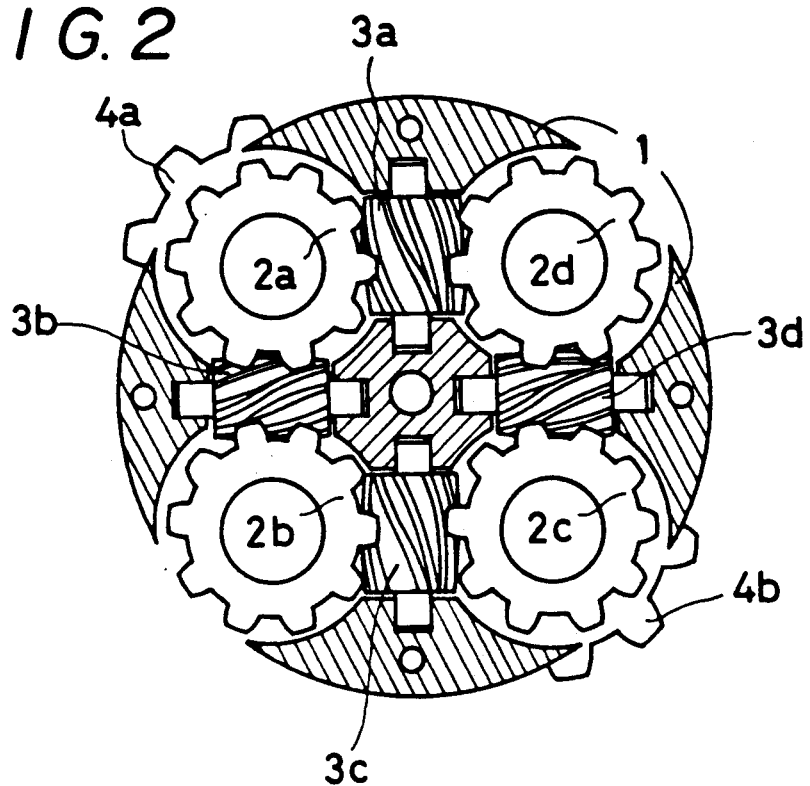
FIG. 2 is a sectional view of one embodiment of the present invention in which four worms and four worm wheels are disposed on a planetary carrier.
Figure 4:
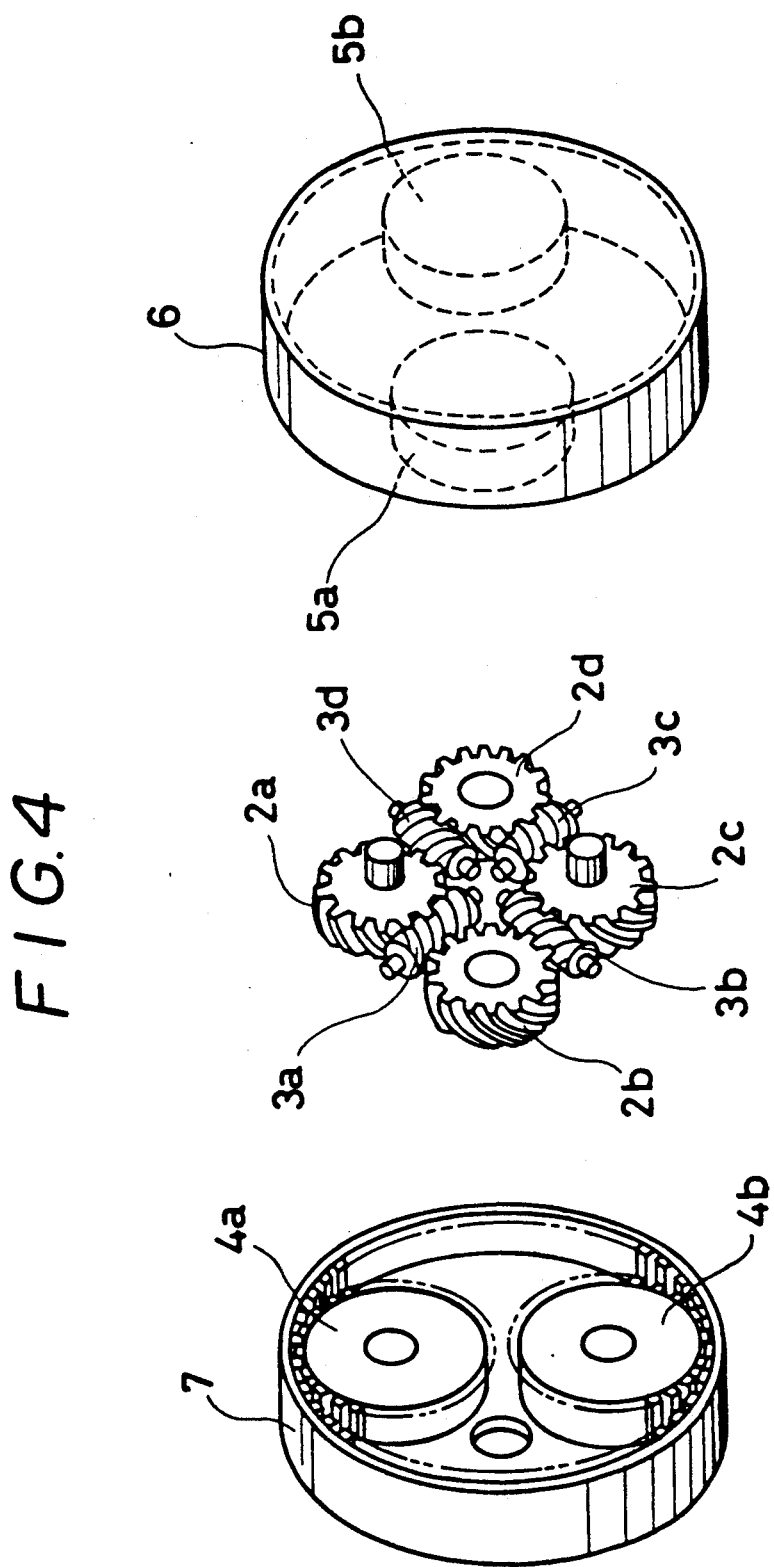
FIG. 4 is a perspective view of an arrangement wherein four worms and four wheels are combined together and pinions are directly connected to the worm wheels in such a manner that the pinions are alternately disposed at either the left- or right-hand of each of the worm wheels (on a first side of the worm wheels and on a second side of the worm wheels) so as to mesh with left- and right-hand internals gears, respectively.

Referring to FIGS. 1, 2, and 4, a planetary carrier 1 has four worms 3a, 3b, 3c and 3d radially disposed thereon. A number of worms wheels 2a, 2b, 2c and 2d which is the same as the number of worms, i.e., four, are disposed on the planetary carrier 1 in such a manner that the respective axes of the worm wheels extend parallel with the axis of the planetary carrier 1, the worm wheels 2a, 2b, 2c and 2d being alternately meshed with the worms 3a, 3b, 3c and 3d. Among the four worm wheels 2a, 2b, 2c and 2d, the two worms wheels 2a and 2c are directly coupled to left-hand pinions 4a and 4b (to pinions 4a and 4b on a first side of the planetary carrier 1), respectively. Similarly, the worm wheels 2b and 2d are directly coupled to right-hand pinions 5a and 5b (to pinions 5a and 5b located on a second side of the planetary carrier 1), respectively. The left-hand pinions 4a, 4b and the righthand pinions 5a, 5b are meshed with left- and right-hand internal gears 6 and 7 (internal gear 6 is located on the first side of planetary carrier 1 and internal gear 7 is located on the second side of the planetary carrier), respectively, so that the rotations of four worm wheels 2a, 2b, 2c and 2d are transmitted to the left- and right-hand internal gears 6, 7. Driving power is transmitted to the worm wheels 2a, 2b, 2c and 2d on the planetary carrier 1 through a propeller shaft (not shown), a pinion 8 and a speed reducing gear 9, thus causing the worm wheels to rotate together in one unit. When there is a relatively small differenc in speed of rotation between left- and right-hand axles 10 and 11 (axle 10 is located on the first side and axle 11 is located on the second side of planetary carrier 1), of the vehicle which are interlocked through the left- and right-hand pinions 4a, 4b and 5a, 5b, the left- and right-hand axles 10 and 11 are allowed to rotate differentially through the worm wheels 2a, 2b, 2c and 2d and the worms 3a, 3b, 3c and 3d. However, when the difference in speed of rotation between the left- and right-hand axles 10 and 11 is relatively large, the differential rotation of these axles 10 and 11 is limited by virtue of the irreversibility of the worms 3a, 3b, 3c and 3d. This irreversible function is similar to that of the conventional Torsen differential.

Figure 5:
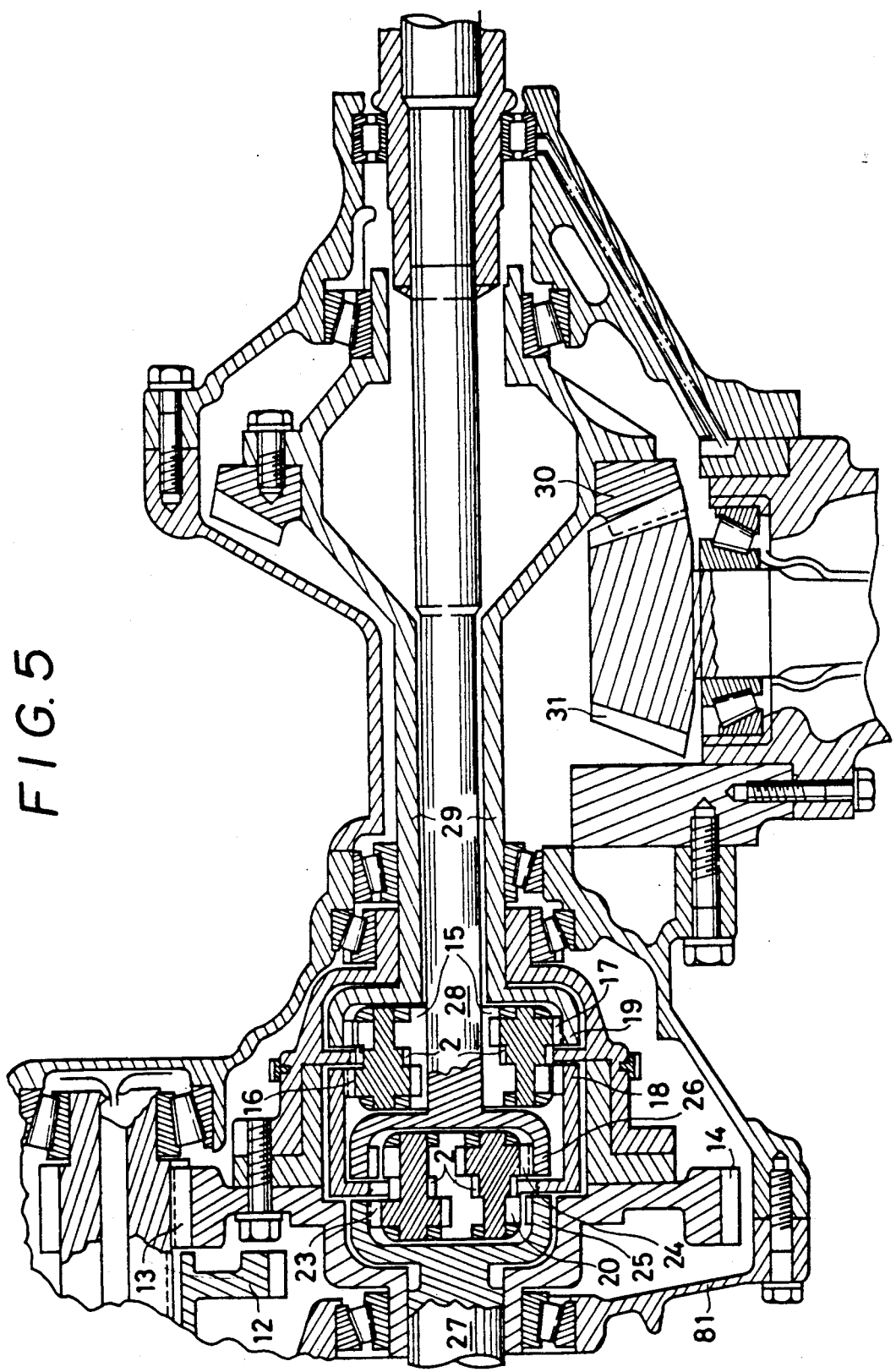
FIG. 5B is a horizontal sectional view of one embodiment of the present invention in which the limited slip differential according to the present invention is applied to a center differential, which shows the respective structures of center and front planetary carriers for a horizontal-engine car.

FIG. 5 shows one embodiment of the present invention in which the limited slip differential of the present invention is applied to a center differential.

Figure 3:
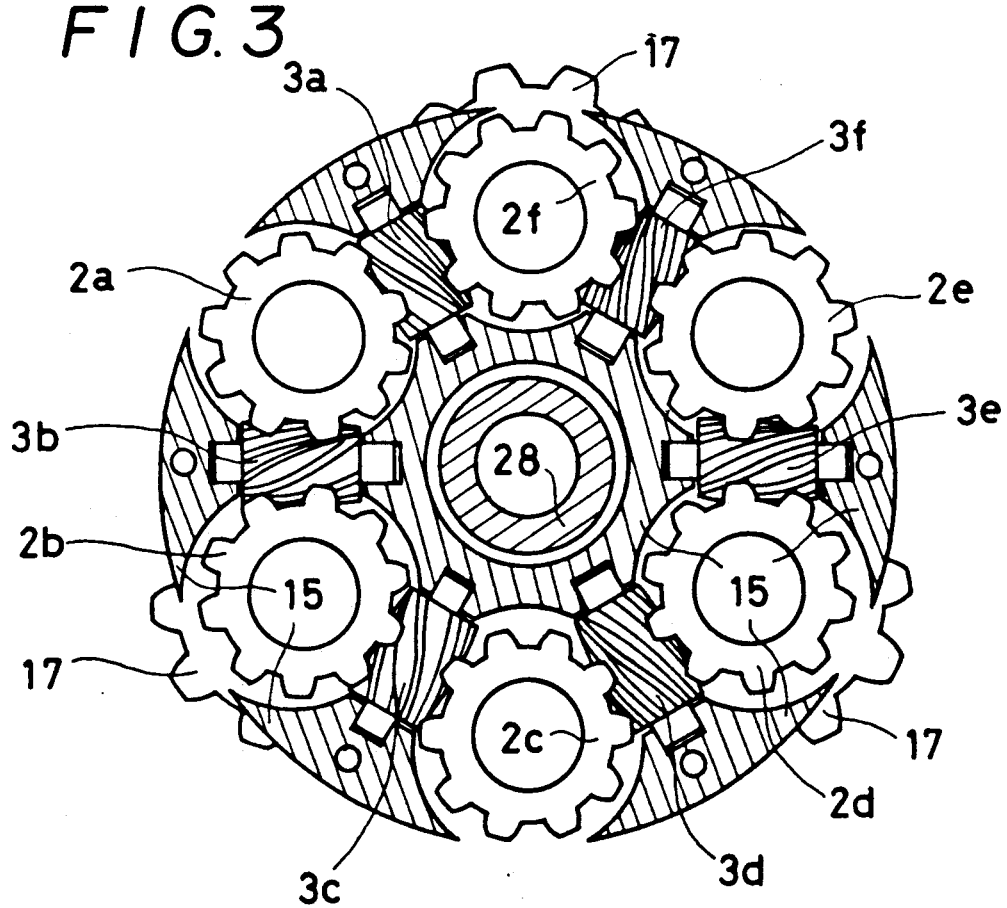
FIG. 3 is a sectional view of one embodiment of the present invention in which six worms and six worm wheels are disposed on a planetary carrier.

The output from the engine is transmitted to a center planetary carrier 15 of the center differential through a transmission 12, a drive gear 13 and a ring gear 14, thus causing the center planetary carrier 15 to rotate. The center planetary carrier 15 is, as shown in FIG. 3, arranged such that six worms 3a, 3b, 3c, 3d, 3e and 3f are alternately meshed with six worms wheels 2a, 2b, 2c, 2d, 2e and 2f. Three of the six worm wheels are directly coupled to respective left-hand pinions 16 which are meshed with a left-hand internal gear 18, while the other three worm wheels are directly coupled to respective right-hand pinions 17 which are meshed with a right-hand internal gear 19, in the same way as in the above-described arrangement. The left-hand internal gear 18 is directly connected and thereby interlocked with a front planetary carrier 20. The front planetary carrier 20 has four worm wheels 2 and four worms 3 disposed thereon in such a manner that the worm wheels 2 alternately meshed with the worms 3 in the same way as in the above-described arrangement. Left- and right-hand pinions 23 and 24 are directly coupled to the respective worm wheels 2 and meshed with left- and right-hand internal gears 25 and 26, respectively. The left-hand internal gear 25 is directly coupled to a left-front axle 27. The right-hand internal gear 26 is directly coupled to a right-front axle 28 which extends through the central portion of the center planetary carrier 15. The right-hand internal gear 19 is further interlocked with a speed increasing gear 30, a pinion 31 and a propeller shaft (not shown). In this case, the differential motion is first limited in the center differential and then further limited in the front and rear differentials.

Figure 6:
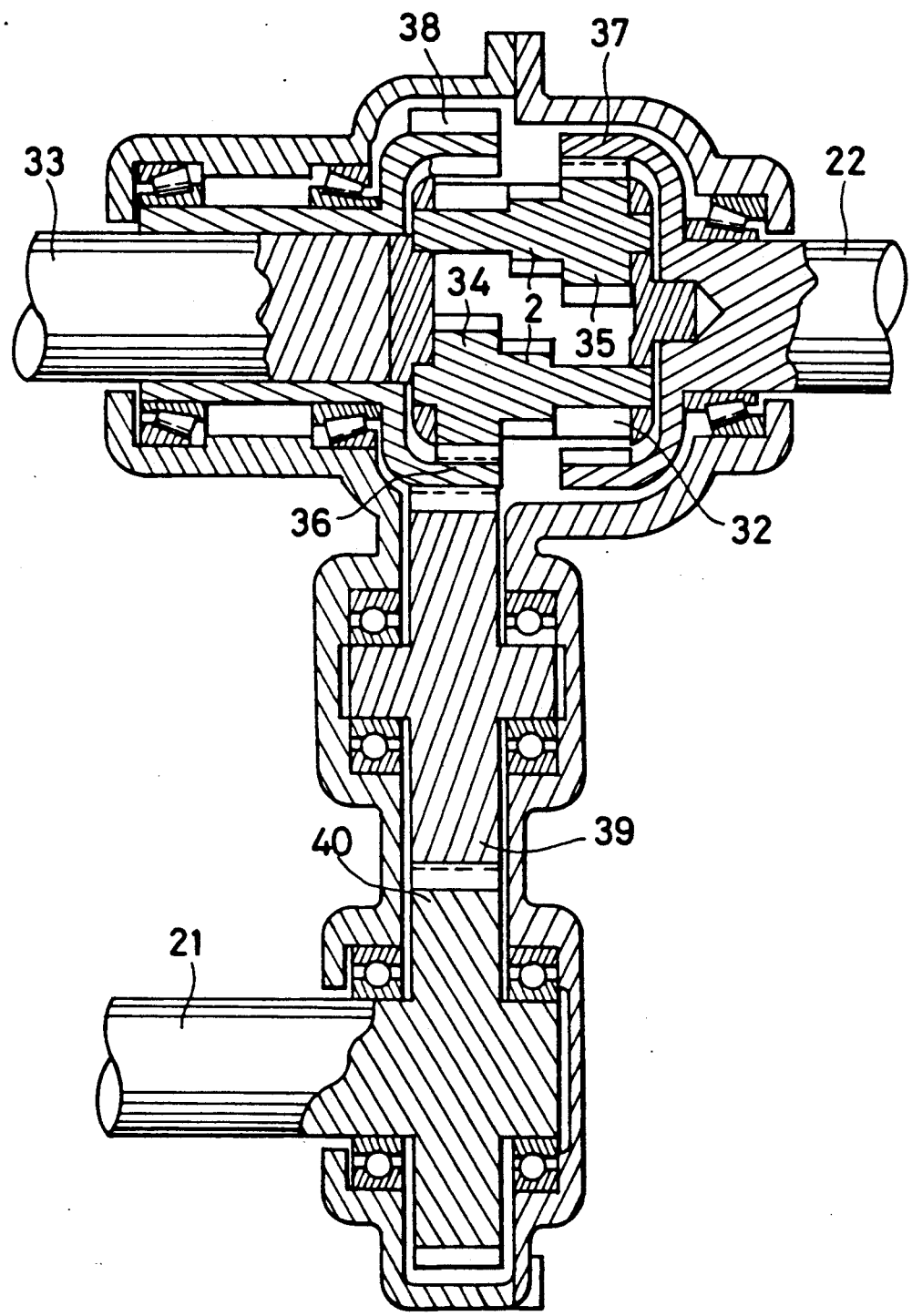
FIG. 6 is a horizontal sectional view of one embodiment of the present invention in which the limited slip differential according to the present invention is applied to a center differential for a vertically mounted engine (vertical-engine) car.

FIG. 6 shows one embodiment of the present invention in which the limited slip differential of the present invention is applied to a center differential used in a vehicle equipped with a vertical engine.

A center planetary carrier 32 is arranged in the same way as in the case of the above-described front and rear planetary carriers 20 and 1. More specifically, the driving power from a transmission shaft 33 which is connected to the axial center of the center planetary carrier 32 is transmitted to front and rear internal gears 36 and 37 through four worm wheels 2 and four worms 3 and further through two front pinions 34 and two rear pinions 35, which are meshed with the front and rear internal gears 36 and 37, respectively, thus causing these internal gears 36 and 37 to rotate. A transfer drive gear 38 is secured to the outer periphery of the front internal gear 36 so as to transfer the rotation of the front internal gear 36 to a transfer driven gear 40 through an idler gear 39, thus causing the driven gear 40 to rotate. In consequence, a shaft 21 which is connected to the transfer driven gear 40 drives left- and right-front wheels (not shown) by a known method. In this case, a chain gear may, of course, be employed in place of the transfer drive gear 38. The rotation of the rear internal gear 37 is transmitted through an inner shaft 22 to the pinion 8 of a rear differential which is similar to the differential shown in FIG. 1. Although in the illustrated example the torque is equally distributed to the front and rear axles, it is possible to change the torque distribution to the front and rear axles as desired by changing the diameters of the front and rear internal gears 36, 37 and those of the front and rear pinions 34, 35.

Figure 7:
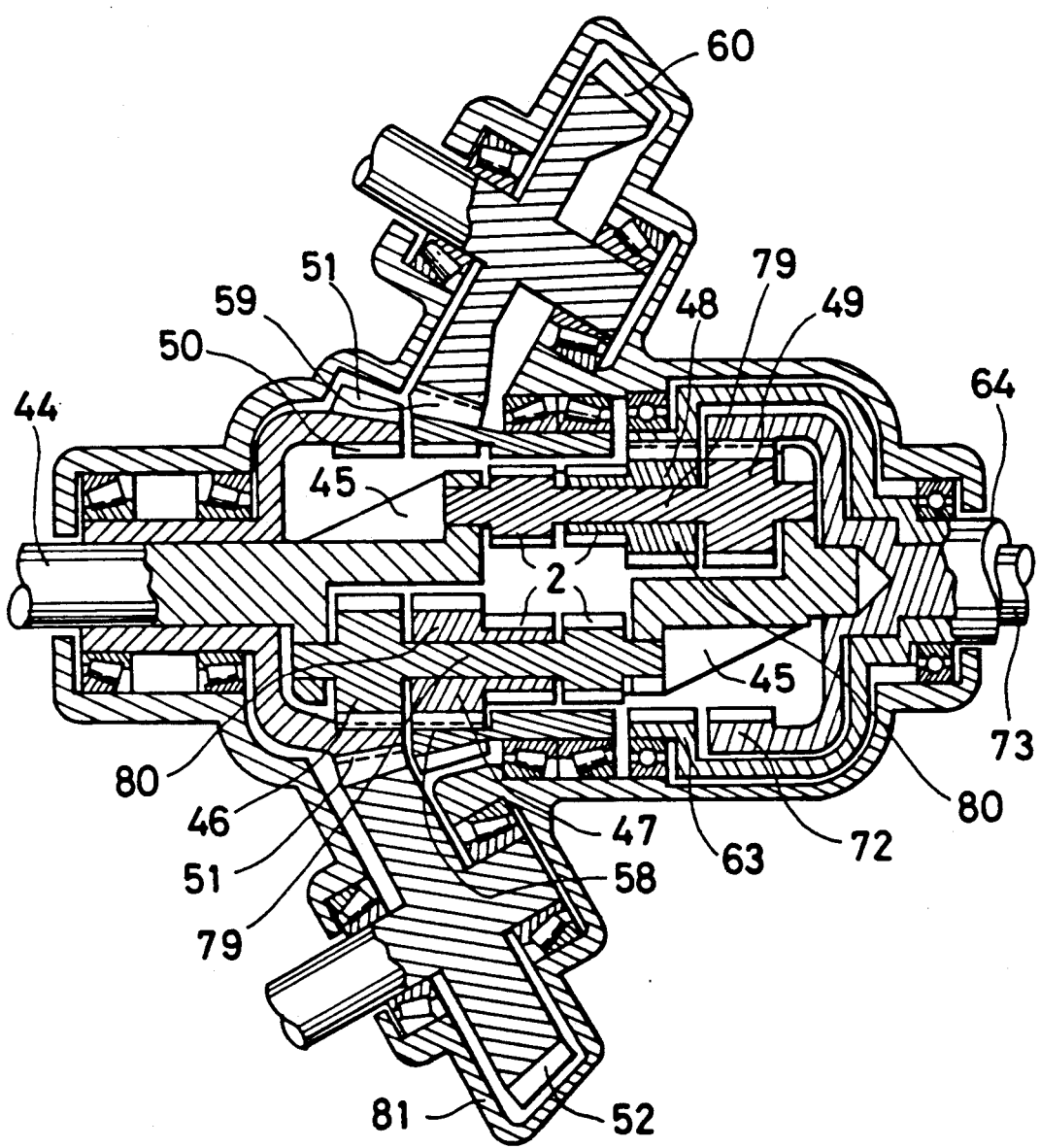
FIG. 7 is a horizontal sectional view of one embodiment of the present invention in which the limited slip differnetial according to the present invention is applied to a double differential.
Figure 8:
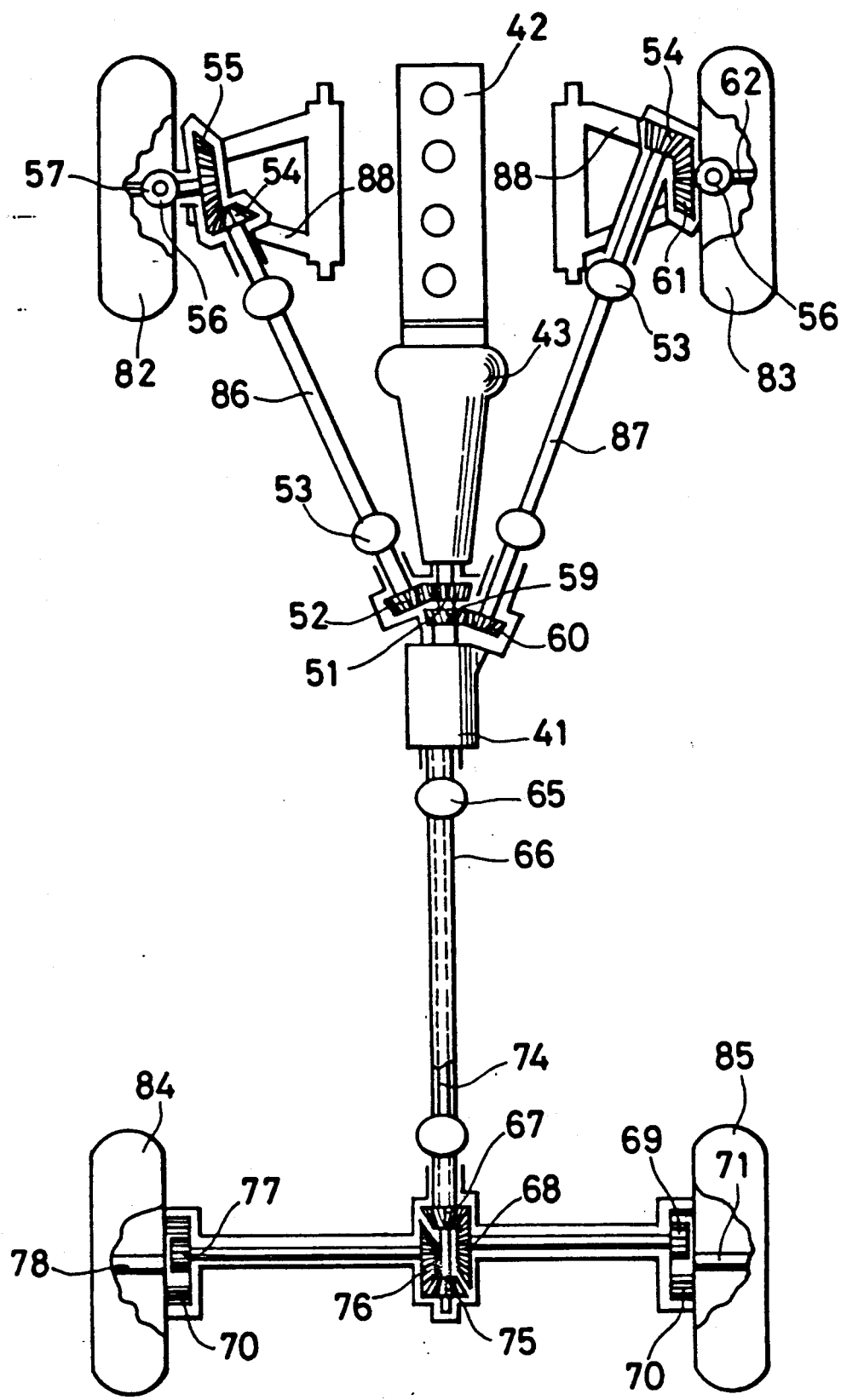
FIG. 8 is a schematic plan view showing the power train of the embodiment shown in FIG. 7 in the form of a skeleton.

FIG. 7 shows a third embodiment of the present invention in which the limited slip differential of the present invention is applied to a double differential 41 (see FIG. 8) for use in a vertical-engine car. In this embodiment, a Y-type power train is used, and the output from an engine 42 is transmitted to a planetary carrier 45 through a transmission 43 and a transmission shaft 44, thus causing the planetary carrier 45 to rotate. Eight worm wheels 2 having a cross-section similar to that of the worm wheels 2 shown in FIG. 2 and eight worms 3 are meshed with each other so as to rotate left- and right-hand pinions 46, 47 and front and rear pinions 48, 49 together with the worm wheels 2 in one unit. A left-hand internal gear 50 causes a left-hand transfer driven gear 52 to rotate through a transfer drive gear 51 which is secured to the outer periphery of the gear 50. The rotation of the gear 52 causes a pinion 54 provided on an arm 88 to rotate through a ball joint 53 and a left-hand propeller shaft 86, thus causing a left-front axle 57 to rotate through a hypoid gear 55 and a ball joint 56.

On the other hand, a right-hand internal gear 58 causes a right-hand transfer driven gear 60 to rotate through a transfer drive gear 59 which is secured to the outer periphery of the gear 58. The rotation of the gear 60 causes a right-front axle 62 to rotate through a ball joint 53, a right-hand propeller shaft 87, a pinion 54 a right-hand hypoid gear 61 and a ball joint 56. At the same time, front internal gear 63 causes a right-rear axle 71 to rotate through a hollow shaft 64, a rubber joint 65, an outer propeller shaft 66, a front pinion 67, a right-hand bevel gear 68, a right-rear pinion 69 and a speed reducing spur gear 70. On the other hand, a rear internal gear 72 causes a left-rear axle 78 to rotate through an inner shaft 73, a universal joint (not shown), an inner propeller shaft 74, a rear pinion 75, a left-hand bevel gear 76, a left-rear pinion 77 and a speed reducing spur gear 70. This operation allows limited differential rotation between the left-front axle 57 and the right-rear axle 71 and also between the right-front axle 62 and the left-rear axle 78.

Figure 9:
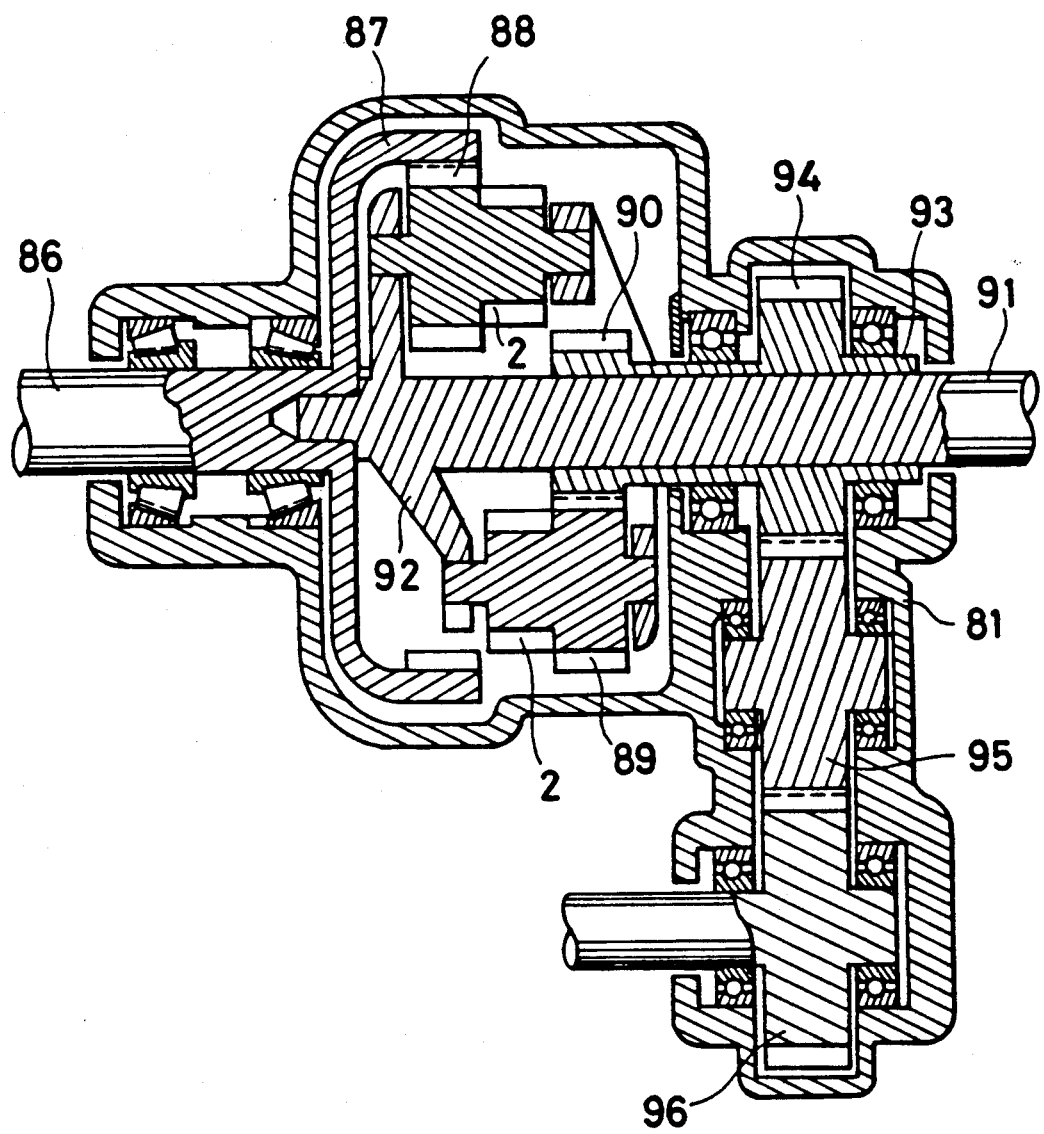
FIG. 9 is a sectional view of one embodiment of the present invention in which the limited slip differential according to the present invention is applied to an arrangement for unequally distributing torque in a vertical-engine car.

Further, there are provided two inner shafts 79 for connecting the respective worm wheels 2 directly to the rear internal gear 72 and two inner shafts 79 for connecting the respective worm wheels 2 directly to the left internal gear 50. There are also provided two hollow shafts 80 (pinions 47) for connecting the respective worm wheels 2 directly to the right internal gear 58 and two hollow shafts 80 (pinions 48) for connecting the respective worm wheels 2 directly to the front internal gear 63. Each of the inner shafts 79 is coaxially disposed inside the corresponding hollow shaft 80 so as to rotate concentrically therewith. Thus, two different kinds of differential drive are achieved by a single planetary carrier 45. In the drawing, the reference numeral 81 denotes a casing, 82 a left-front wheel, 83 a right-front wheel, 84 a left-rear wheel, and 85 a right-rear wheel. The number of combinations of worm wheels 2 and worms 3 which are to be provided depends on the level of torque which is to be transmitted and the necessity of shafts which extend through hollow shafts, and said number may be determined to be four or six or more in accordance with each individual use. For example, in a fourth embodiment of the present invention shown in FIG. 9, three front pinions 88 are meshed with an internal gear 87 which is directly connected to a transmission shaft 86 so as to rotate together with it in one unit. Three worm wheels 2 are directly connected to the respective front pinions 88, and three other worm wheels 2 are directly connected to three rear pinions 89, respectively. These two different groups of worm wheels 2 are alternately disposed in the circumferential direction and engaged with each other through six worms 3 in such a manner that each pair of adjacent worm wheels 2 are coupled together through one worm 3 in the same way as in the case of the arrangement shown in FIG. 3. The rear pinions 89 revolves around a sun gear 90 while rotating on a center planetary carrier 92 which is directly connected to an inner shaft 91 interlocked with a rear differential, thereby distributing two different levels of torque. This structure is suitable for vertical-engine full-time four-wheel drive cars. More specifically, the rotation of the sun gear 90 which provides relatively small torque activates a front differential (not shown) by a known method through a hollow shaft 93, a transfer drive gear 94, an idler gear 95 and a transfer driven gear 96, while the rotation of the inner shaft 91 provides torque approximately double that of the hollow shaft 93.

Although the present invention has been described in detail by way of preferred embodiments thereof, it should be noted here that the described embodiments are not necessarily exclusive and various changes and modifications may be imparted thereto without departing from the spirit and scope of the invention which is limited solely by the appended claims.

What is claimed is:

1. A limited slip differential comprising:
    a planetary carrier;
    four or more even-numbered worms radially disposed on said planetary carrier;
    a number of worm wheels, said number of worm wheels being the same in number as the number of worms, said worm wheels alternating with said worms such that each worm wheel meshes with adjacent said worms, said worm wheels being disposed on said planetary carrier such that the respective axes of said worm wheels extend parallel with the axis of said planetary carrier; pinions disposed at opposite first and second sides of said planetary carrier, said pinions being equal in total number to said number of worm wheels, each worm wheel rotating in a first direction being coupled with pinions on said first side and each worm wheel rotating in a second opposite direction being coupled with pinions on said second side during a differential movement; a first shaft passing through a center of the planetary carrier, said shaft being coupled to one of said pinions on said second side, a hollow shaft defining a space for passage of said first shaft therethrough, said hollow shaft being coupled with one of said pinions on said second side.

2. A limited slip differential according to claim 1, wherein said first shaft is coupled to one of said pinions on said first side by an internal gear connected to said first shaft, said internal gear engaging said one of said pinions on said first side.

3. A limited slip differential according to claim 2, wherein said hollow shaft is connected to an external gear, said external gear being engaged with one of said pinions on said second side.

4. A limited slip differential according to claim 2, wherein said hollow shaft is connected to an internal gear, said internal gear meshing with pinions on said first side.

5. A limited slip differential according to claim 1, wherein said first shaft is coupled to one of said pinions on said second side via a second planetary carrier, said second planetary carrier including four or more even-numbered second planetary carrier worms radially disposed on said second planetary carrier and a number of second planetary carrier worm wheels, said number of second planetary carrier worm wheels being the same in number as the number of second planetary carrier worms, said second planetary carrier worm wheels alternating with said second planetary carrier worms such that each second planetary carrier worm wheel meshes with adjacent second planetary carrier worms, said second planetary carrier worm wheels being disposed on said second planetary carrier such that the respective axes of said second planetary carrier worm wheels extend parallel with the axes of said second planetary carrier, second planetary carrier pinions disposed at said opposite first and second sides of said second planetary carrier, said second planetary carrier pinions being equal in total number to said number of second planetary carrier worm wheels, each second planetary carrier worm wheel rotating in a first direction being coupled with second planetary carrier pinions on said first side of said second planetary carrier and each second planetary carrier worm wheel rotating in a second opposite direction being coupled with second planetary carrier pinions on said second side of said second planetary carrier, said first shaft including an internal gear, said internal gear being coupled with a second planetary carrier pinion of said second planetary carrier, said second planetary carrier being directly coupled with an additional internal gear, said additional internal gear being coupled with said one of said pinions on said second side.

* * * * *